United States Patent [19]
Fujino et al.

[11] Patent Number: 5,500,841
[45] Date of Patent: Mar. 19, 1996

[54] INFORMATION STORAGE AND RETRIEVAL DEVICE

[75] Inventors: Keijirou Fujino, Tokorozawa; Koichi Yamazaki, Sakado, both of Japan

[73] Assignee: Nippon Conlux, Ltd., Tokyo, Japan

[21] Appl. No.: 354,363

[22] Filed: Dec. 12, 1994

[30] Foreign Application Priority Data

Dec. 28, 1993 [JP] Japan ................................. 5-351236

[51] Int. Cl.$^6$ ..................................................... G11B 7/00
[52] U.S. Cl. .................................. 369/44.26; 369/44.28; 235/477; 235/480
[58] Field of Search ............................. 369/44.26, 44.28; 235/477, 480

[56] References Cited

U.S. PATENT DOCUMENTS 5,285,433  2/1994  Oshiba .................................. 369/44.26

FOREIGN PATENT DOCUMENTS

| 301537 | 2/1989 | European Pat. Off. . |
| 361935 | 4/1990 | European Pat. Off. . |
| 451773 | 10/1991 | European Pat. Off. . |
| 63-106968 | 5/1988 | Japan . |
| 4038766 | 2/1992 | Japan . |

*Primary Examiner*—Harold Pitts
*Attorney, Agent, or Firm*—Loeb and Loeb

[57] ABSTRACT

An information storage and retrieval device comprising a card conveyor mount for supporting and conveying a card-type information storage medium; a drive means having a linear motor, for reciprocatingly driving the card conveyor mount; an electrical power control circuit having switching elements, for providing power to the linear motor; speed detection means and for detecting the speed at which the card conveyor mount is moving. A speed command for calculating an indicated speed corresponding to an output from the speed detection means, shaping a speed command therefrom, and sending the command to the electrical power control circuit; and an optical head for irradiating a laser beam onto the information storage medium; whereby information is written to the information storage medium by the optical head irradiating the laser beam onto the information storage medium, and information is read therefrom by detecting laser light reflected from the information storage medium; the information storage and retrieval device further comprising a comparison means having a pair of comparators and having identical threshold values of different polarities.

2 Claims, 5 Drawing Sheets

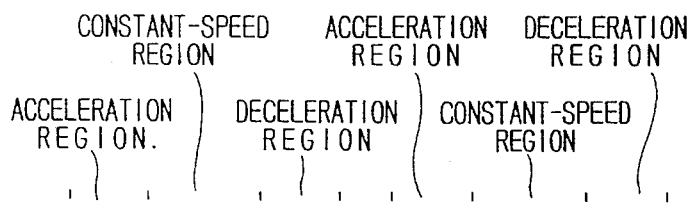
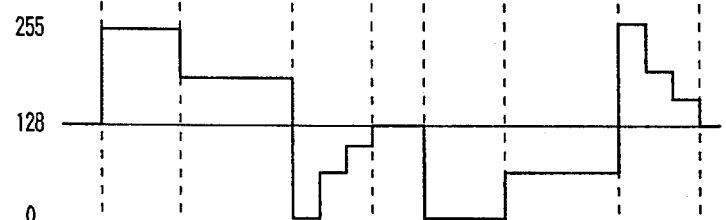
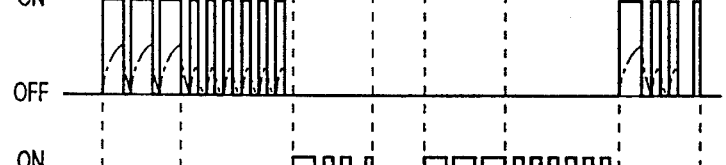
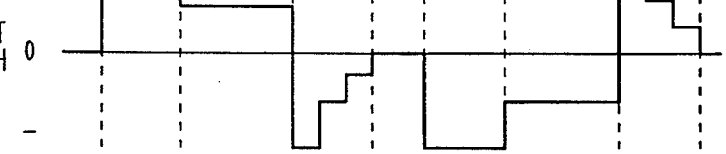

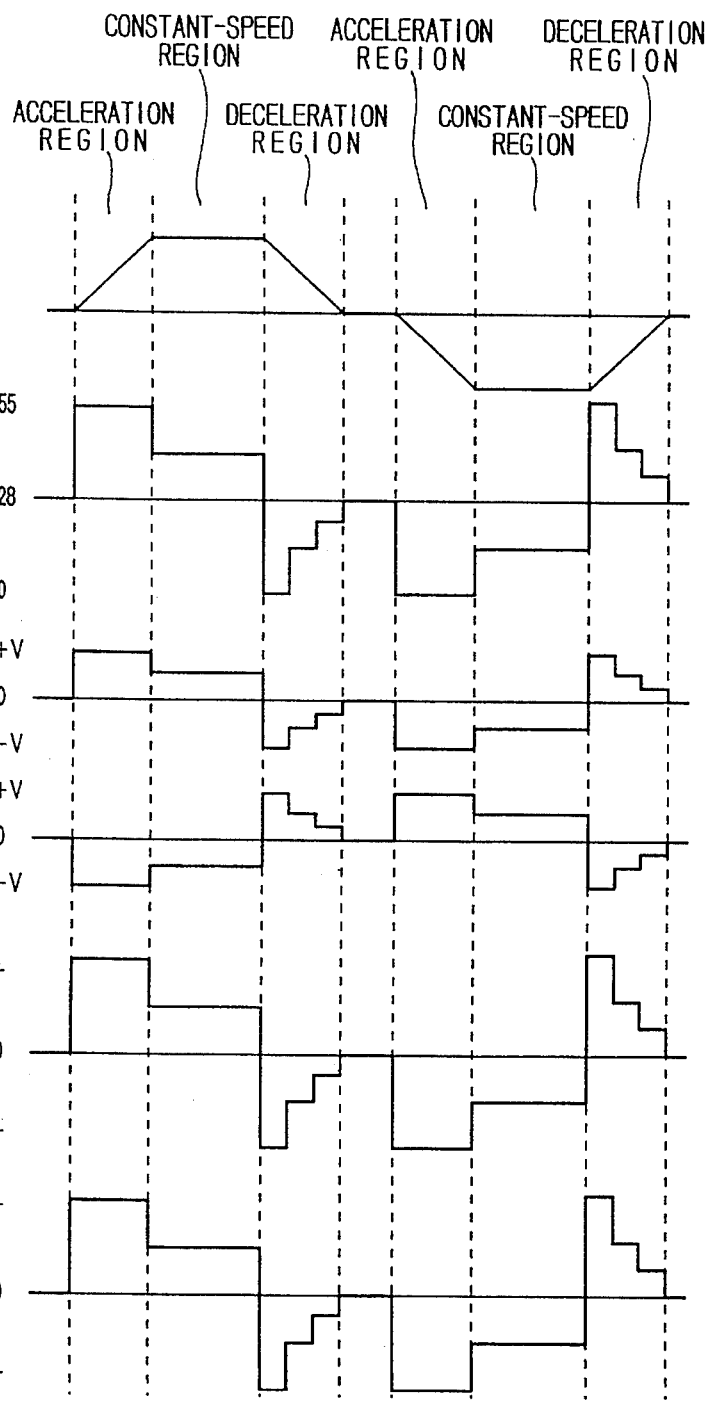

INFORMATION STORAGE AND RETRIEVAL DEVICE

BACKGROUND OF THE INVENTION

The present invention relates to an optical information storage and retrieval device for a card-type optical information storage medium and, in particular, to a device of such a type that controls the drive of a drive means of a conveyor mount or an optical head.

Prior Art

Cards have recently attracted attention as compact optical information storage media. A device of this type is arranged such that information is recorded along the longitudinal direction of a rectangular card, so that information can be recorded and retrieved by causing the card and an optical head to be moved relatively and linearly to and fro. For that reason, a linear motor is used as a drive means and the configuration is such that a control circuit controls motor drive currents in accordance with speed control signals.

An example of a prior art circuit configuration that provides this type of control is shown in FIG. 4. In this circuit, a D/A converter 22 shapes an analog signal in accordance with an output from a controller 21 and sends it to an inverting amplifier 23. An output of the inverting amplifier 23 is sent to a non-inverting input pin of an amplifier 24 and an inverting input pin of another amplifier 25, and a current is sent from these two amplifiers to a linear motor coil 26 as shown by the solid line or the broken line in the figure. A current flowing through the linear motor coil 26 is detected by a resistor 28 and is fed back to the input side of the inverting amplifier 23 via a differential amplifier 27. It is then superimposed on the output of the D/A converter 22 to provide feedback control of the amount of power sent to the linear motor coil 26. The amount of movement of a card conveyor mount 30 caused by the power sent to the linear motor is detected as movement of a linear scale 31 by a linear sensor 32, this is fed back to the controller 21 and is used for determining the amount of current to the linear motor coil 26.

The waveforms of signals, voltages, and currents at various parts of this circuit are as shown in FIG. 5. As shown in this figure, when the card conveyor mount 30 accelerates linearly, is held at a constant speed, and then decelerates linearly, as shown in FIG. 5 (a), the output voltage of the D/A converter 22 is divided into an acceleration region, a constant-speed region, and a deceleration region, as shown in FIG. 5 (b). One of the outputs of the amplifiers 24 and 25, which act in mutually opposite phase in response to the signal amplified by the inverting amplifier 23, similarities to the waveform of FIG. 5 (b) and the other is the mirror image thereof, as shown in FIGS. 5 (c) and (d).

Voltages of the same waveform as that of the output of the D/A converter 22 are applied to the linear motor coil 26, as shown in FIGS. 5 (e) and (f), and thus currents of the same waveform flow therethrough.

Problem To Be Solved By the Invention

In this manner, the control circuit is configured using amplifiers, and the waveform in each amplifier is continuously powered. As a result, there is a problem in that the amplifiers generate a great deal of heat so that the temperature within the information storage and retrieval device becomes quite high and thus the temperature within the apparatus into which the information storage and retrieval device is incorporated also rises.

SUMMARY OF THE INVENTION

The present invention was devised in the light of the above described problem and has as its objective the provision of an optical information storage and retrieval device in which the above generation of heat is prevented, by a configuration in which outputs of an electrical power control circuit to a drive means are controlled to turn on and off by switching elements.

Means of Solving the Problem

In order to achieve the above objective, the present invention relates to an information storage and retrieval device comprising a card conveyor mount for supporting and conveying a card-type information storage medium; a drive means having a linear motor, for reciprocatingly driving the card conveyor mount; an electrical power control circuit having switching elements, for providing power to the linear motor; speed detection means for detecting the speed at which the card conveyor mount is moving; a speed command means for calculating an indicated speed corresponding to an output from the speed detection means, shaping a speed command therefrom, and sending the command to the electrical power control circuit; and an optical head for irradiating a laser beam onto the information storage medium; whereby information is written to the information storage medium by the optical head irradiating the laser beam onto the information storage medium, and information is read therefrom by detecting laser light reflected from the information storage medium. The information storage and retrieval device of the present invention further provides a comparison means having a pair of comparators having identical threshold values of different polarities, for comparing the speed command with each of the threshold values and shaping a pair of outputs that are on during the period that the command exceeds the threshold values; wherein powering currents of the linear motor are controlled and thus drive control of the card conveyor mount is enabled by controlling switching elements in the electrical power control circuit to turn on and off in accordance with the outputs from the comparison means. Alternatively, the information storage and retrieval device causes the optical head to move instead of the card.

Alternatively, the present invention relates to an information storage and retrieval device comprising a card support mount for supporting a card-type information storage medium; an optical head having a laser device, for irradiating a laser beam onto the information storage medium; a drive means having a linear motor, for moving the optical head in a reciprocating manner relative to the card support mount while irradiating a laser beam onto the information storage medium; an electrical power control circuit having switching elements, for providing power to the linear motor; a speed detection means for detecting the speed at which the card support mount is moving; and a speed command means for calculating an indicated speed corresponding to an output from the speed detection means and shaping a speed command therefrom; whereby information is written by irradiating the laser beam and information is read by detecting laser light reflected from the information storage medium. The information storage and retrieval device of the present invention further provides la comparison means having a pair of comparators having identical threshold values of different polarities, for comparing the speed command with each of the threshold values and shaping a pair of outputs that are on during the period that the command exceeds the threshold values; wherein powering currents of the linear motor are controlled and thus drive control of the card conveyor mount is enabled by controlling switching elements in the electrical power control circuit to turn on and off in accordance with the outputs from the comparison means.

Operation

In accordance with the configuration of claim 1, the card conveyor mount is caused to move reciprocatingly with respect to the fixed optical head by the execution of sequential and inverted powering control for the linear motor of the drive means, so that the laser light irradiates on the information storage medium and thus information is either written to this medium or previously written information is read therefrom. On/off currents from the switching elements of the electrical power control circuit pass through the linear motor of the drive means to generate drive power. The switching elements are configured to provide sequential and inverted powering control, paired comparison means are provided because each of the two switching elements passes current separately, and each of the comparison means performs a comparison with its threshold value and shapes an on/off signal.

In accordance with the configuration of claim 2, the optical head is caused to move reciprocatingly with respect to the fixed card support mount by the execution of sequential and inverted powering control for the linear motor of the drive means, so that the laser light irradiates on the information storage medium and thus information is either written to this medium or previously written information is read therefrom. On/off currents from the switching elements of the electrical power control circuit pass through the linear motor of the drive means to generate drive power. Since the switching elements provide sequential and inverted powering control, separate elements are provided, paired comparison means are provided because each of the two switching elements passes current separately, and each of the comparison means performs a comparison with its threshold value and shapes an on/off signal.

Effects of the Invention

With the configuration of claim 1, the generation of excess heat during power supply can be prevented by enabling the output current of the electrical power control circuit that provides power to the drive means to be controlled by periods during which the switching means turns on and off.

As a result, temperature rise within the information storage and retrieval device is suppressed, and the card conveyor mount can be operated efficiently in a reciprocal manner. With the configuration of claim 2, the generation of excess heat while power is being supplied can be prevented by enabling the output current of the electrical power control circuit that supplies power to the drive means to be controlled by periods during which the switching means turns on and off.

As a result, temperature rise within the information storage and retrieval device is suppressed, and the optical head can be operated efficiently in a reciprocal manner.

BRIEF DESCRIPTION OF THE DRAWINGS

FIGS. 3a–3e show waveforms of the parts of the circuit of FIG. 1;

FIGS. 5a–5f show waveforms of the parts of the circuit of FIG. 4.

DESCRIPTION OF THE PREFERRED EMBODIMENT

Figure 1:
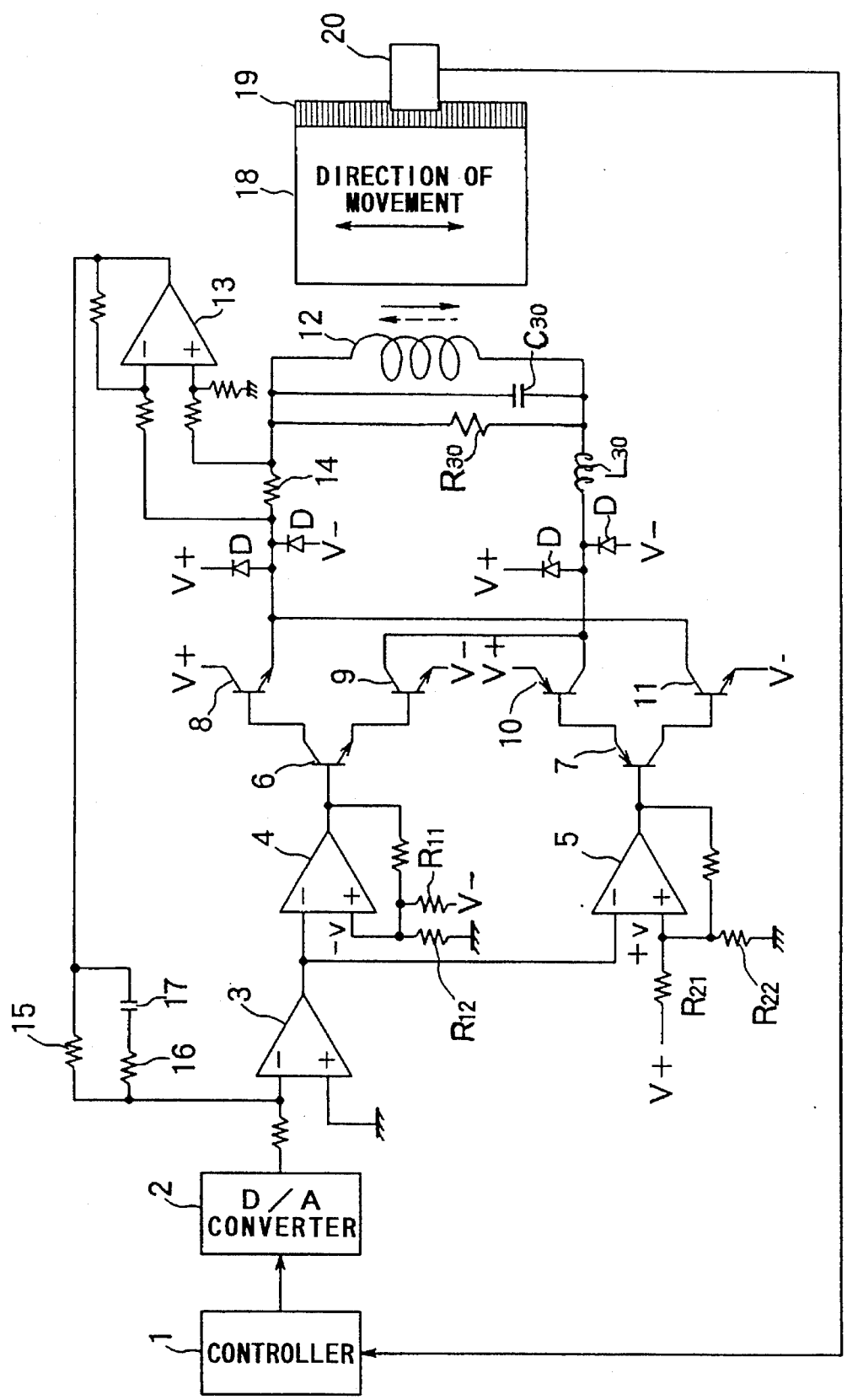
FIG. 1 is a block diagram of the circuit configuration of one embodiment of the present invention.
Figure 4:
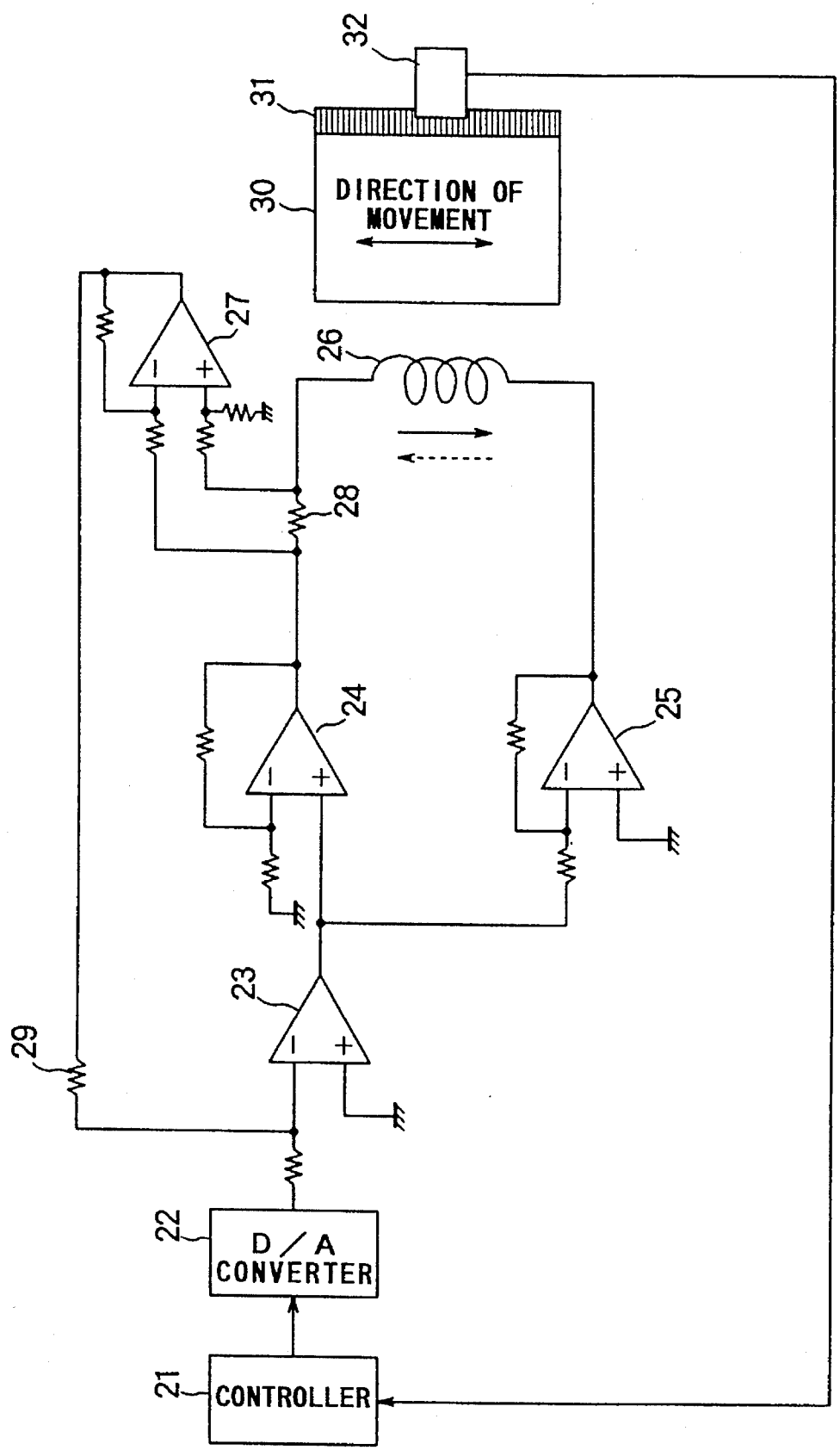
FIG. 4 shows a card conveyor mount control circuit of the prior art.

An embodiment of the present invention is shown in FIG. 1. In this figure, the basic configuration of the overall control means is essentially the same as that shown in FIG. 4, wherein a controller 1 is equivalent to the controller 21, a D/A converter 2 is equivalent to the D/A converter 22, an amplifier 3 is equivalent to the amplifier 23, a linear motor coil 12 is equivalent to the linear motor coil 26, a card conveyor mount 18 is equivalent to the card conveyor mount 30, a linear scale 19 is equivalent to the linear scale 31, and a linear sensor 20 is equivalent to the linear sensor 32.

The components that distinguish the circuit of FIG. 1 from the prior art are a pair of comparators 4 and 5, each having a different threshold value, and switching elements to 11 forming two sets of circuits that operate as switches in response to outputs from the comparators 4 and 5.

The comparators 4 and 5 each receive an output from the inverting amplifier 3 through an inverting input pin of an operational amplifier, and each compares it with its threshold value. The threshold value of the comparator 4 is a negative divided voltage of a voltage-divider circuit formed of resistors R11 and R12 inserted between a power source V− and ground, and the threshold value of the comparator 5 is a positive divided voltage of a voltage-divider circuit formed of resistors R21 and R22 inserted between a power source V+ and ground.

Thus, if the output of the D/A converter 2 is positive, the output of the inverting amplifier 3 becomes negative. If it exceeds the threshold value −v of the comparator 4, an output is generated from the comparator 4, causing a transistor 6 to be turned on, which turns on transistors 8 and 9 connected to the collector and emitter thereof, thus causing a current to pass through the linear motor coil 12 connected between the transistors 8 and 9.

In a similar manner, if the output of the D/A converter 2 is negative, the output of the inverting amplifier 3 becomes positive. If it exceeds the threshold value +v of the comparator 5, an output is generated from the comparator 5, causing a transistor 7 to be turned on, which turns on transistors 10 and 11 connected to the collector and emitter thereof, thus causing a current to pass through the linear motor coil 12 connected between the transistors 8 and 9.

The current that flows through the linear motor coil 12 in this manner generates a drop in the voltage between the ends of a resistor 14 connected in series with the linear motor coil 12, and the voltages at each of these two ends are sent to positive and negative input pins of a differential amplifier 13. If a current flows through the linear motor coil 12 in the direction shown by the solid line, since a positive voltage is applied to the negative input pin of the differential amplifier 13 and a negative voltage is applied to the positive input pin thereof, the output of the differential amplifier 13 becomes negative and is applied as a negative feedback signal to the inverting input pin of the inverting amplifier 3 via a feedback circuit formed of resistors 15 and 16 and a capacitor 17.

During this time, since the signal being applied from the D/A converter 2 to the inverting amplifier 3 is positive, the input to the inverting amplifier 3 is decreased by an amount equivalent to the feedback signal. When the current of the linear motor coil 12 rises as far as a certain value, the feedback signal from the resistor 14 becomes so big that the output of the inverting amplifier 3 decreases far enough to fall below the threshold value of the comparator 4. As a result, the transistor 6 turns off so that the transistors 8 and 9 also turn off, which stops the current to the linear motor coil 12.

When the current to the linear motor coil 12 stops, the feedback signal from the resistor 14 disappears and the output of the D/A converter 2 is sent to the inverting amplifier 3 without being decreased by an amount equivalent to the feedback signal, so that the transistors 6, 8, and 9 turn on again and start operating.

The above described operation is the same for the comparator 5 and the transistors 7, 10, and 11 when the output of the D/A converter 2 becomes negative. In this case, the direction of the current to the linear motor coil 12 is shown by the broken line in the figure.

Since a surge is generated in these power pathways every time the current to the linear motor coil 12 is made to flow or is cut off by turning the transistors on or off in this manner, the configuration is such that diodes D are connected to the collectors of the transistors 8, 9, 10, and 11, as means of preventing this surge.

In addition, noise absorption elements comprising the resistor 16 and the capacitor 17 are inserted into the feedback pathway that includes the differential amplifier 13, to cope with impulses generated in the output of the differential amplifier.

In order to prevent high-frequency noise in the roughly vertical pulse waveforms shown in FIG. 3 (c) and (d), a resistor R30, capacitor C30, and coil L30 between the switching elements (formed of transistors 6, 8, and 9 and transistors 7, 10, 11) and the ends of the linear motor coil 12 form a circuit (snubber circuit) that softens these waveforms and thus acts to prevent high-frequency noise.

Figure 2:
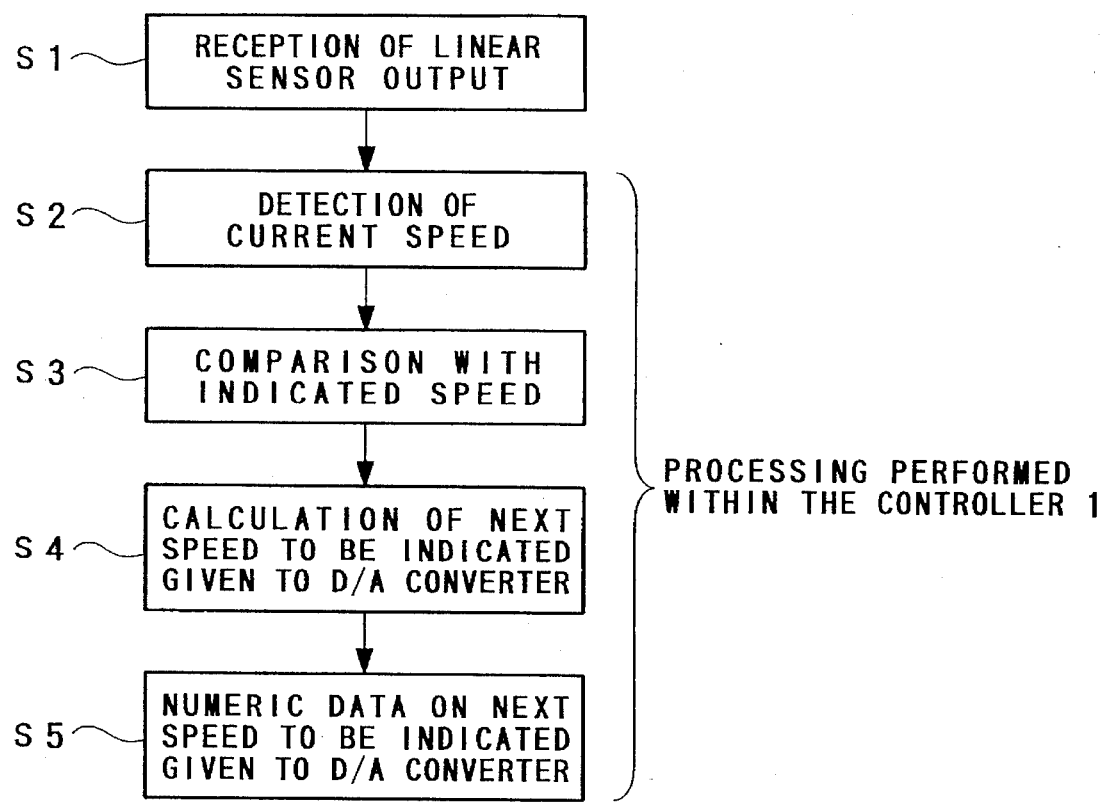
FIG. 2 is a flow chart of details of the operation of the controller in the circuit of FIG. 1.

A flowchart of the operation of the controller 1 in the circuit of FIG. 1 is shown in FIG. 2. The controller 1 receives an output from the linear sensor (step S1) and detects the current speed (step S2). The detected current speed is then compared with an indicated speed that was previously set in the controller 1 (step S3) and the next speed to be indicated is calculated (step S4). Numeric data on the calculated speed is given to the D/A converter 2 which converts it into an analog signal to be given to the inverting amplifier 3 (step S5).

Signal waveforms of the various parts of the circuit when the card conveyor mount is being moved to and fro are shown in FIG. 3 (a) to (e). The speed of the card conveyor mount is divided into an acceleration region, a constant-speed region, and a deceleration region, as shown in FIG. 3 (a).

First, in the acceleration region, since the speed of the card conveyor mount is rising, the output of the D/A converter 2 has a large positive value (in other words, if the range from positive to negative is 256 steps, this output is at the +127th step) and this is given to the inverting amplifier 3. The inversion of the inverting amplifier 3 sends large negative voltages to the comparators 4 and 5. In this case, the comparator 4 generates an output to turn the transistor 6 on. This turns on the transistors 8 and 9 as well (FIG. 3 (c)). As shown by the broken lines, when the current in the linear coil increases as an exponential function, the feedback operation causes the output of the inverting amplifier 3 to drop so that the transistors 8 and 9 turn off temporarily. Once the current has dropped sufficiently, the transistors 8 and 9 turn on again and current again starts to pass through the linear coil.

Next, in the constant-speed region, the output from the D/A converter 2 to the inverting amplifier 3 becomes smaller, as shown in FIG. 3 (b). In answer thereto, the periods during which the transistors 8 and 9 are on become shorter, as shown in FIG. 3 (b). At the same time, the off periods become longer than they were in the acceleration region. This is to ensure that the powering current of the linear coil is decreased to be smaller and gentler than in the acceleration region.

Finally, in the deceleration region, the output of the D/A converter 2 becomes negative so that the comparator 5 generates an output instead of the comparator 4, and thus the transistors 10 and 11 turn on. In the deceleration region, the output of the D/A converter 2 changes in three steps so that both the on periods and the off periods of the transistors 10 and 11 are also changed to three steps (FIG. 3 (d)).

The average currents that flow through the linear coil in the acceleration region, constant-speed region, and deceleration region correspond to the output of the D/A converter 2, as shown in FIG. 3 (e). This enables smooth movement of the card conveyor mount while it is being accelerated, moved at constant speed, and decelerated.

The above described embodiment concerned the movement of a card conveyor mount, but the movement of the optical head can, of course, be controlled in a similar manner.

What is claimed is:

1. An information storage and retrieval device comprising a card conveyor mount for supporting and conveying a card-type information storage medium; a drive means having a linear motor, for reciprocatingly driving said card conveyor mount; an electrical power control circuit having switching elements, for providing power to said linear motor; a speed detection means for detecting the speed at which said card conveyor mount is moving; a speed command means for calculating an indicated speed corresponding to an output from said speed detection means, shaping a speed command therefrom, and sending said command to said electrical power control circuit; and an optical head for irradiating a laser beam onto said information storage medium; whereby information is written to said information storage medium by said optical head irradiating said laser beam onto said information storage medium, and information is read therefrom by detecting laser light reflected from said information storage medium; said information storage and retrieval device further comprising:

a comparison means having a pair of comparators having identical threshold values of different polarities, for comparing said speed command with each of said threshold values and shaping a pair of outputs that are on during the period that said command exceeds said threshold values; wherein:

powering currents of said linear motor are controlled and thus drive control of said card conveyor mount is enabled by controlling switching elements in said electrical power control circuit to turn on and off in accordance with said outputs from said comparison means.

2. An information storage and retrieval device comprising a card support mount for supporting a card-type information storage medium; an optical head having a laser device, for irradiating a laser beam onto said information storage medium; a drive means having a linear motor, for moving said optical head in a reciprocating manner relative to said card support mount while irradiating a laser beam onto said information storage medium; an electrical power control circuit having switching elements, for providing power to said linear motor; a speed detection means for detecting the speed at which said optical head is moving; and a speed command means for calculating an indicated speed corresponding to an output from said speed detection means and shaping a speed command therefrom; whereby information is written by irradiating said laser beam and information is read by detecting laser light reflected from said information storage medium; said information storage and retrieval device further comprising:

a comparison means having a pair of comparators having identical threshold values of different polarities, for comparing said speed command with each of said threshold values and shaping a pair of outputs that are on during the period that said command exceeds said threshold values; wherein:

powering currents of said linear motor are controlled and thus drive control of said optical head is enabled by controlling switching elements in said electrical power control circuit to turn on and off in accordance with said outputs from said comparison means.

* * * * *